UNITED STATES PATENT OFFICE.

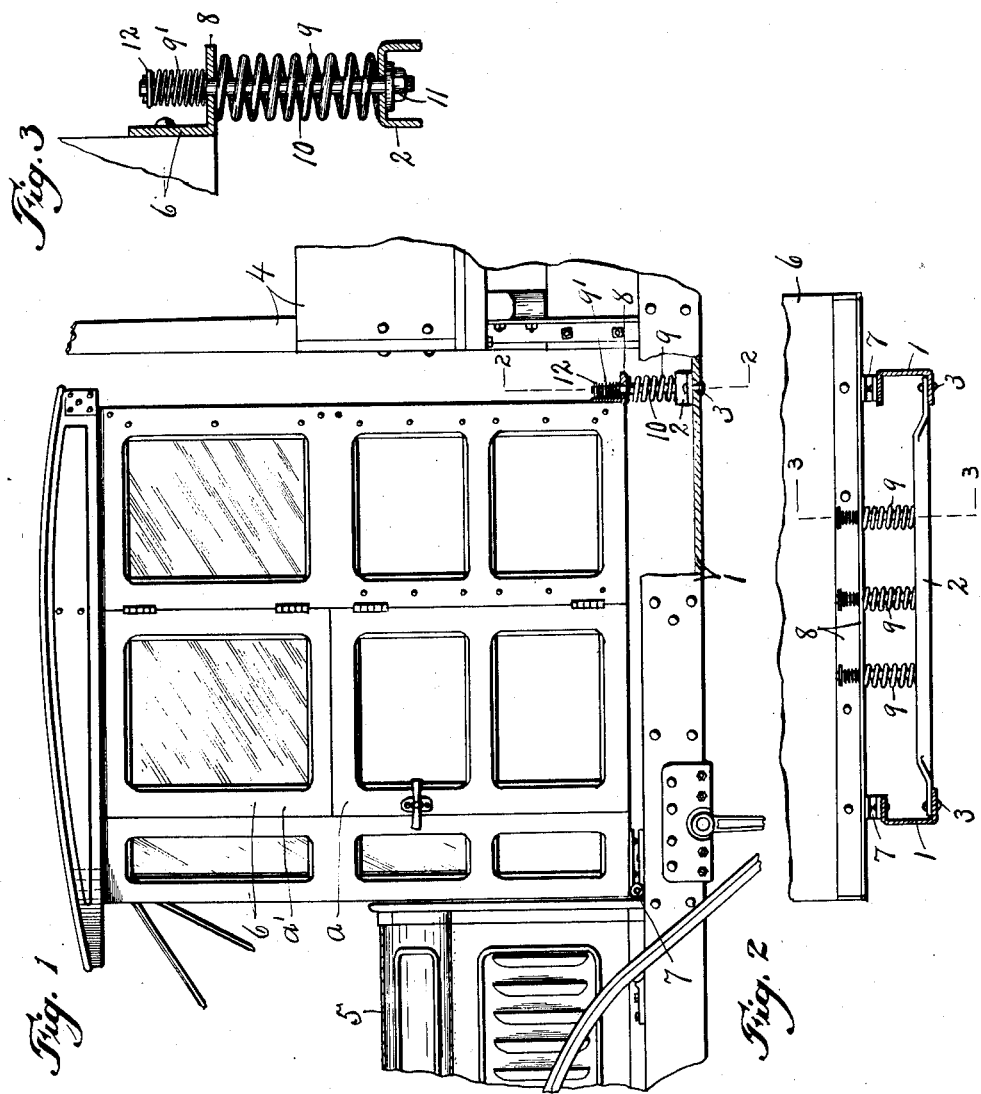

NUGENT MILNER, OF WATERTOWN, NEW YORK, ASSIGNOR TO H. H. BABCOCK COMPANY, OF WATERTOWN, NEW YORK, A CORPORATION OF NEW YORK.

ROAD-VEHICLE OF THE MOTOR-TRUCK TYPE.

1,384,269.   Specification of Letters Patent.   Patented July 12, 1921.

Application filed November 26, 1919. Serial No. 340,690.

*To all whom it may concern:*

Be it known that I, NUGENT MILNER, a citizen of England and a subject of the King of Great Britain, a resident of Watertown, in the county of Jefferson, in the State of New York, have invented new and useful Improvements in Road-Vehicles of the Motor-Truck Type, of which the following, taken in connection with the accompanying drawings, is a full, clear, and exact description.

This invention relates to certain improvements in road vehicles of the motor truck type, having a cab between the platform or body and hood of the engine, and refers more particularly to the manner of mounting the cab upon the chassis.

It is well known that in vehicles of this type the chassis frame is subjected to severe twisting or torsional strains due partly to the uneven distribution of loads thereon and partly to uneven road surfaces over which the truck passes, and that owing to the fact that the cab must necessarily be supported between the ends of the chassis frame it is obvious that if the cab is rigidly mounted upon the frame bars, the twisting motion of said bars will be transmitted to the frame and other parts of the cab—resulting in excessive strains upon the joints to such an extent as to frequently separate the parts or at least necessitate frequent repairs.

This is particularly true of closed cabs having movable windows or doors in which case the excessive strains caused by the twisting motion of the chassis cause the windows and doors to bind and to thereby render the opening and closing movement difficult.

The main object, therefore, of my present invention is to mount the cab upon the chassis in such a manner as to avoid this objectionable result, or in other words to relieve the cab from the twisting or torsional strains to which the chassis frame is subjected.

Other objects and uses relating to specific details of the cab mounting will be had in the following descriptions.

In the drawings, Figure —1— is a side elevation, partly in section and partly broken away, of a portion of a motor truck chassis showing a closed cab with my improved mounting, together with adjacent portions of the truck body or platform and engine hood.

Fig. —2— is a transverse vertical sectional view taken in the plane of line 2—2, Fig. —1—.

Fig. —3— is an enlarged vertical sectional view taken on line 3—3, Fig. —2—.

As illustrated, the chassis frame comprises a pair of similar lengthwise side bars, —1—, and a cross bar, —2—, each side bar consisting of a channel iron arranged with its lengthwise flanges projecting inwardly, one above the other, the cross bar, —2—, being secured at its ends by bolts or rivets, —3—, to the lower flange of the lengthwise bars, —1—, as shown more clearly in Fig. —2—, said lengthwise bar being also made of channel iron having its flanges at the bottom, as shown more clearly in Fig. —3—.

A body or platform, —4— and an engine hood, —5— are mounted in longitudinally spaced relation upon the chassis frame bars, —1— and secured thereto in any suitable manner not necessary to herein illustrate or describe. A closed cab, —6—, is yieldingly mounted upon the chassis frame, in a manner presently described, between the body or platform, —4—, and hood, —5—, and has its forward end hingedly connected at —7—, to said chassis, and its rear end provided with a cross bar, —8—, overlying the cross bar, —2—, in vertically spaced relation thereto to permit the interposition of one or more,—in this instance, three,— coil springs, —9—, which serve as resilient connections between the rear end of the cab and chassis frame to yieldingly resist the movement of these parts toward each other; or, in other words, to constitute resilient supports for the rear end of the cab for coöperation with the hinged connections, —7— in reducing to a minimum the transmission of twisting motion of the frame bars to the parts of the cab and thereby to prevent impairment of said parts, which might loosen the joints or interfere with the free operation of a door as —*a*— or a window, as —*a'*—.

The cross bar, —8— preferably consists of angle iron having one flange secured to the lower rear face of the cab and its other flange projecting rearwardly therefrom to form a seat for the adjacent end of the springs, —9—.

Suitable bolts, —10— are passed through the registering apertures in the bars —2— and —8— and also through the coil spring, —9—, and some distance above the horizontal flange of bar —8—, the lower ends of said bolts being provided with heads or nuts, —11— while the upper ends are provided with similar nuts or shoulders, —12— at some distance above the horizontal flange of the cross bar —8—.

The upper portion of these bolts are surrounded by coiled buffer springs, —9'— interposed between the horizontal flange of the cross bar, —8— and their respective shoulders —12— to yieldingly resist relative movement of the chassis and rear end of the cab away from each other, or in other words, to prevent excessive rebound of the cab by the relatively heavier springs —9— when the vehicle is passing over uneven road surface.

It will be observed that the cab is supported in a manner described independently of the body or platform, —4— and hood, —5— and that a limited amount of twisting movement of the chassis frame may result from unequal distribution of the load on the body or platform or from passing over uneven road surfaces, without transmitting such twisting movement to the cab,—thereby relieving the latter from these strains which would otherwise impair its use and shorten its life in case the cab was rigidly secured to the chassis in the usual manner.

What I claim is:

1. In combination with a chassis frame having opposite lengthwise side bars and a cross bar, a cab hinged at its front end to the chassis and having its rear end provided with a cross bar overlying the first-named cross bar, springs interposed between the cross bars, bolts passed through the cross bars and spring and having their upper ends provided with shoulders, and separate springs of less resistance than that of the first named spring interposed between the second named cross bar and shoulders.

2. In a motor truck, the combination of a chassis frame having lengthwise side bars and a cross bar connecting the side bar, a cab hinged at its front end to swing about a horizontal axis and having its rear end provided with a rearwardly projecting flange over-hanging said cross bar, bolts passed through vertically registering apertures in the cross bar and over-lying flange, coil springs surrounding said bolts and having their lower ends resting on the cross bar and their upper ends resting against the under side of the flange, said bolts extending some distance above the flange and having their upper ends provided with nuts adjustable thereon, and coil springs encircling the upper portions of the bolts between the flange and nuts, the second named springs being relatively lighter than the first named springs.

In witness whereof I have hereunto set my hand this 19th day of November, 1919.

NUGENT MILNER.

Witnesses:
A. G. DAVIS,
ELIZABETH STEWART.